Feb. 19, 1963 J. P. FAY 3,078,352

SIGNAL TRANSLATING APPARATUS AND METHOD

Filed April 17, 1959

INVENTOR
James P. Fay

BY Johnson and Kline
ATTORNEYS

United States Patent Office 3,078,352

Patented Feb. 19, 1963

3,078,352

SIGNAL TRANSLATING APPARATUS AND METHOD

James P. Fay, Norwalk, Conn., assignor to The Teletrak Corporation, Wilmington, Del., a corporation of Delaware Filed Apr. 17, 1959, Ser. No. 807,109
1 Claim. (Cl. 179—100.2)

This invention relates to devices for recording or reproducing signals, particularly high frequency electrical signals. More specifically, it pertains to a transducer head for translating signals onto or from a sensitized tape and a method for carrying out the same.

In recording or reproducing signals it is the practice to move the sensitized tape, onto or from which the signal is to be translated, and the transducer head relative each other so that the gap in the head traverses the tape, in close proximity thereto, in a predetermined path. The relative movement between the head and the tape occurs at such a speed that an air film or layer is created between the two which separates them. While this separation is desirable to facilitate the relative movement of the head and tape, in that it substantially reduces friction therebetween, it has been found that it results in signal loss during translation, onto or from the tape.

The present invention overcomes this problem by substantially decreasing the thickness of the air layer separating the tape and the head at the scanning locus, without eliminating it altogether, thereby continuing the substantially frictionless relative movement of the two while permitting them to move into closer signal translating proximity.

Accordingly, it is an important object of the invention to cause a sensitized tape to closely overlie the gap in a transducer head by decreasing the thickness of the air film separating them when they are being relatively moved.

The decrease in the thickness of the air layer is achieved in the present invention by reducing the air pressure between the pole pieces, defining the gap, and the tape.

It is, therefore, also an object of the invention to reduce the air pressure adjacent the pole pieces of the transducer head so that the air film between the gap and the tape is decreased in thickness thereby enabling the tape to closely overlie or embrace the gap.

An important feature of the invention is the simple, inexpensive and highly effective means for reducing air pressure between the relatively moving tape and transducer head. According to the invention, air foil surfaces are formed around the pole pieces, outwardly of the body or casing of the head, for increasing the velocity of the air passing therearound as the head and/or tape are moved. This increase in air velocity around the pole pieces causes a reduction in air pressure adjacent the pieces or between the tape and the pieces, thereby resulting in a decrease in the thickness of the air film.

Thus, another object of the invention is to provide in an apparatus for translating signals onto or from a sensitized tape, air foil means for increasing the velocity of the air passing around the pole pieces of the transducer head thereof, whereby the layer of air between the head and the tape is substantially reduced in thickness.

It is further an object of the invention to provide a transducer head having integrally formed air foil surfaces extending around the outwardly disposed pole pieces of the head for increasing the velocity of the air passing therearound so that the resultant reduction in air pressure adjacent the pole pieces causes the air layer to be decreased in thickness enabling the tape to closely overlie the gap.

Other objects and advantages of the invention will be apparent from the specification and claim when considered in connection with the attached sheet of drawings, illustrated one form of the invention, wherein like characters represent like parts and in which:

Figures 1, 2, 3, 4, 5, 6:
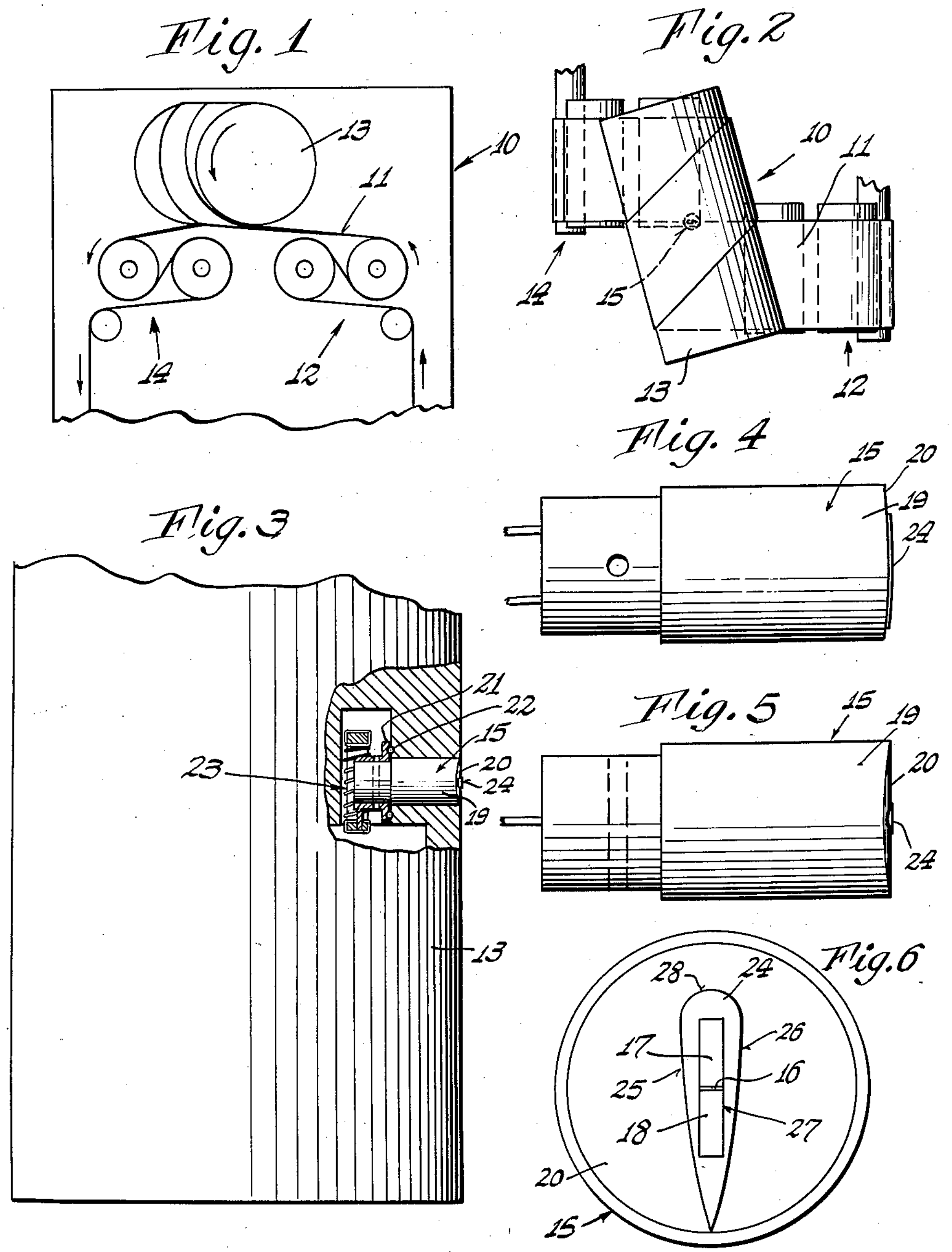
FIGURE 1 is a fragmentary diagrammatic illustration of a signal recording and/or reproducing apparatus showing the operating relationship between a sensitized tape and the tape carrying drum.
FIG. 2 is a fragmentary top view of a signal recording and/or reproducing apparatus showing the relationship between the transducer head and the sensitized tape.
FIG. 3 is an enlarged fragmentary view, partially broken away and in section, of a tape carrying drum with a transducer head therein.
FIG. 4 is a side view of a transducer head.
FIG. 5 is a top view of a transducer head.
FIG. 6 is an end view of a transducer head.

Referring now to the drawings, in FIGS. 1 and 2, one embodiment of the invention is shown in an apparatus 10 for translating signals onto or from a sensitized tape. As illustrated, the sensitized tape 11 which may be of the type having a magnetic coating on one surface thereof, is fed for either recording or reproducing purposes, by means of a feed roller assembly 12 or the like, around a tape carrying drum 13, which is rotated at high speed in a direction opposite to that traveled by the tape, and thereafter to a take-up roller or cinch assembly 14. During the relative travel of tape 11 with respect to drum 13, the sensitized surface of the tape is traversed in a predetermined manner by a transducer head 15, which is recessed in and carried by the drum. To be more specific, the tape is traversed along predetermined paths by a scanning gap 16 formed between the opposed ends of pole pieces 17 and 18 which extend outwardly of the drum surface 13 and form part of the transducer head.

While transducer head 15 of the apparatus 10 may be of any type commonly known to the art and may be mounted in the tape carrying drum 13 by any convenient means, in the illustrated form of the invention (see FIG. 3) the head and the mounting therefor are of the type disclosed in the copending application of James P. Fay and James K. Pickard, Serial Number 721,531, filed March 14, 1958, now Patent No. 3,029,318. The transducer head, which as aforenoted is recessed in drum 13, includes a casing or body member 19 having an end wall 20, through which pole pieces 17 and 18 extend, lying in the curvilinear plane of the outer surface of the drum and forming a continuation thereof. A collar 21, pinned or similarly connected to head 15 and rotatably engaging drum 13 through ball bearings 22, mounts the head for rotation and operably connects the same to a remote control head adjusting device 23 for aligning the gap with a predetermined path on the tape.

In the operation of the signal translating apparatus 10 and as a result of the high speed relative movement between the transducer head 15 and the tape 11 thereof, an air layer or film is created between the outer surface of drum 13 and the tape, maintaining them in separated relationship. It will be understood that since the end wall or face 20 of transducer head 15, outwardly of which pole pieces 17 and 18 extend, lies in the curvilinear plane of the outer surface of the drum, that the air layer will similarly maintain the tape in separated relationship with the pole pieces 17 and 18 and the scanning gap 16 therebetween. While the separation of the tape from engagement with drum 13 and the face 20 of the transducer head is desirable to facilitate the frictionless high speed relative movement therebetween, it is undesirable in that there is a reduction of signal intensity as the space between the scanning gap 16 and the tape is increased.

I have found that the problem of loss of signal intensity can be overcome, without unduly increasing the friction between the relatively moving tape and tape carrying drum 13, by decreasing the thickness of the air layer or film between the drum and the tape at the gap so that the tape may closely overlie the gap. The thickness of the air layer is decreased, in accordance with the invention, by reducing the air pressure adjacent the sides of pole pieces 17 and 18, which results in a similar air pressure reduction between the pole pieces and the sensitized tape. While the reduction in air pressure around pole pieces 17 and 18 may be accomplished by means of vacuum drawing devices or the like, in the illustrated form of the invention an air foil 24 is positioned with respect to the pole pieces so as to increase the velocity of the air passing therearound. The increase in the velocity of the air as it passes pole pieces 17 and 18 causes a low pressure area to be created adjacent the sides of the pole pieces, which in turn results in a reduction of air pressure between the pole pieces and the sensitized tape, thereby enabling the tape to closely overlie the gap 16. Air foil 24, as illustrated most clearly in FIGS. 4 through 6, includes air foil surfaces 25 and 26 formed integral with end wall 20 of head casing 19 and extending outwardly therefrom a distance no greater than outwardly extending pole pieces 17 and 18. It will be observed that pole pieces 17 and 18, which define between them the scanning gap 16, form an elongate member 27 extending in the direction of relative movement of the recording head. The air foil surfaces 25 and 26 are connected at the leading edge by a broad curved surface 28 to enclose and completely surround the elongate member 27 with their lengthwise dimension extending in the direction of travel of the member. As the transducer head 15 and the tape are relatively moved at high speed, the air crossing the end wall 20 of the head is compressed as it is deflected by the leading edge 28 so that its velocity is increased and as a result of the increase in velocity the pressure of the air adjacent the longitudinal sides of the member is reduced and the thickness of the air layer between the pole pieces and the tape is decreased whereby the tape is enabled to closely overlie the gap. In this manner the loss of signal intensity, which results from the tape being separated from the gap by the air layer, is eliminated without completely eliminating the air layer so that deleterious friction is created between the tape and the head and drum.

The term high speed, as used herein, relates to the relative movement between the transducer head and the sensitized tape and defines a speed which is sufficient to create an air layer or film between the tape and the scanning gap.

Thus, among others, the several objects of the invention as aforenoted are achieved. Obviously numerous changes in the structure may be resorted to without departing from the spirit of the invention as defined by the claim.

I claim:

In an apparatus for translating signals onto or from a sensitized tape including a rotatable tape carrying drum, a transducer head recessed in said drum and having an end wall thereof lying in the curvilinear plane of the surface of said drum for traversing said tape in a predetermined path, said head having pole pieces extending outwardly of said end wall defining a gap therebetween for translating association with said tape, and means for relatively moving said drum and said tape at high speed; the improvement in the transducer head comprising air foil surfaces formed on said end wall and extending outwardly of said drum surface around and adjacent said pole pieces for increasing the velocity of the air flow passing therearound when said drum and tape are relatively moved, whereby the air pressure between said pole pieces and said tape is reduced to enable the latter to closely overlie said gap.

References Cited in the file of this patent

UNITED STATES PATENTS

| | | |
|---|---|---|
| 2,862,781 | Baumeister | Dec. 2, 1958 |
| 2,864,892 | Perkins | Dec. 16, 1958 |
| 2,921,144 | Martin | Jan. 12, 1960 |
| 2,921,990 | Ginsburg et al. | Jan. 19, 1960 |
| 2,972,738 | Sliter | Feb. 21, 1961 |

FOREIGN PATENTS

| | | |
|---|---|---|
| 927,999 | Germany | May 23, 1955 |

UNITED STATES PATENT OFFICE
CERTIFICATE OF CORRECTION

Patent No. 3,078,352 February 19, 1963

James P. Fay

It is hereby certified that error appears in the above numbered patent requiring correction and that the said Letters Patent should read as corrected below.

Column 2, line 6, for "illustrated" read -- illustrating --; column 4, under "UNITED STATES PATENTS" add the following:

2,772,135 Hollabaugh --------Nov. 27, 1956

Signed and sealed this 24th day of September 1963.

(SEAL)
Attest:

ERNEST W. SWIDER
Attesting Officer

DAVID L. LADD
Commissioner of Patents